(12) United States Patent
Wünning et al.

(10) Patent No.: US 8,911,230 B2
(45) Date of Patent: Dec. 16, 2014

(54) ASSISTED FLAMELESS OXIDATION OPERATION AND BURNER THEREFOR

(75) Inventors: Joachim A. Wünning, Leonberg (DE); Joachim G. Wünning, Leonberg (DE)

(73) Assignee: WS Waermeprozesstechnik, GmbH, Renningen (DE)

(*) Notice: Subject to any disclaimer, the term of this patent is extended or adjusted under 35 U.S.C. 154(b) by 699 days.

(21) Appl. No.: 12/592,340

(22) Filed: Nov. 23, 2009

(65) Prior Publication Data

US 2010/0092897 A1    Apr. 15, 2010

Related U.S. Application Data

(63) Continuation-in-part of application No. PCT/EP2008/003602, filed on May 6, 2008.

(51) Int. Cl.
| | |
|---|---|
| *F23N 5/20* | (2006.01) |
| *F23N 1/02* | (2006.01) |
| *F23C 9/00* | (2006.01) |
| *F23D 11/44* | (2006.01) |
| *F23N 5/18* | (2006.01) |
| *F23N 5/02* | (2006.01) |
| *F23N 5/00* | (2006.01) |
| *F23C 7/06* | (2006.01) |
| *F23C 3/00* | (2006.01) |

(52) U.S. Cl.
CPC ....... *F23C 3/002* (2013.01); *F23C 2900/99006* (2013.01); *F23C 2900/99001* (2013.01); *F23C 2900/03009* (2013.01); *F23C 7/06* (2013.01); *Y02E 20/342* (2013.01); *F23C 9/006* (2013.01)
USPC ................. 431/6; 431/12; 431/115; 431/215; 110/186; 110/190

(58) Field of Classification Search
USPC .............. 431/6, 12, 115, 215; 110/186, 190
See application file for complete search history.

(56) References Cited

U.S. PATENT DOCUMENTS

| | | | |
|---|---|---|---|
| 3,729,285 A | | 4/1973 | Schwedersky |
| 4,347,052 A | * | 8/1982 | Reed et al. ................... 431/188 |
| 4,351,645 A | * | 9/1982 | Marion et al. .................... 48/61 |
| 5,570,679 A | * | 11/1996 | Wunning .................... 126/91 A |
| 2007/0072141 A1 | * | 3/2007 | Daneri et al. ................. 431/329 |

FOREIGN PATENT DOCUMENTS

| | | |
|---|---|---|
| DE | 197 40 788 C1 | 9/1998 |
| EP | 0 463218 A1 | 1/1992 |
| EP | 0 685 683 81 B1 | 10/1998 |
| JP | 58-148409 | 2/1982 |
| JP | 62-276309 | 12/1987 |
| JP | 07-332624 | 12/1995 |

* cited by examiner

*Primary Examiner* — Kenneth Rinehart
*Assistant Examiner* — William Corboy
(74) *Attorney, Agent, or Firm* — Klaus & Bach

(57) ABSTRACT

In a burner and method for the operation of such a burner which is provided with first fuel and air supply means for FLOX® operation and second fuel and air supply means for operation with flame combustion, a control unit is provided for controlling fuel and air supply means in such a manner that, aided by flame combustion operation, the temperature required for FLOX® operation is rapidly achieved and FLOX® operation can be maintained at least in the region directly in front of the burner so as to provide for assisted FLOX® operation of the burner already before the conditions for pure FLOX® operation are established.

3 Claims, 2 Drawing Sheets

ASSISTED FLAMELESS OXIDATION OPERATION AND BURNER THEREFOR

This is a Continuous-In-Part Application of pending international application PCT/EP2008/003602 filed May 6, 2008 and claiming the priority of German application 07010225.6 filed May 23, 2007.

BACKGROUND OF THE INVENTION

The invention relates to a method for bringing about a fuel oxidation in a recirculating exhaust gas stream for heating a volume, in particular at temperatures of the volume below the ignition temperature of the fuel, and also to a burner for achieving said method.

EP 0 685 683 B1 discloses that volumes such as, for example, furnace spaces or the interior spaces of jet pipes can be heated by flameless oxidation of fuel. In order to bring about flameless oxidation, a strong recirculation of the combustion gases is brought about in the affected volume. Preheated air and fuel are injected into the combustion gases. In so doing, a uniform release of thermal energy occurs in a larger section of volume with minimal thermal NOx formation at a reaction temperature of below 1500° C. However, this requires that sufficiently high temperatures prevail in the furnace space. In accordance with EP 0 685 683 B1, as well as in accordance with WO 2007/017056 A1, this is accomplished by means of a combustion chamber which is integrated into the burner, whereby fuel as well as combustion air can be injected into said combustion chamber. The resultant mixture is ignited in the combustion chamber. The developing hot gases leave the combustion chamber and arrive in the volume that is to be heated. Such burners are set up for two modes of operation:

1. Combustion with a stable flame in the combustion chamber as long as the temperature in the volume to be heated is below the ignition temperature of the fuel that is being used.

2. Combustion outside the combustion chamber in the volume to be heated as soon as the temperature of said volume is above the ignition temperature. The high exit speed of the air effects the desired strong recirculation of the combustion gases in the volume, thus preventing high temperatures and the thermal NOx formation.

There are applications in which the volume to be heated can or should be heated only gradually, for example, due to its size or the character of its content. It is also possible that the desired process-specific final temperature is relatively low, for example, below the ignition temperature of the fuel.

If, in these cases, the furnace space is heated by means of a flame, high temperatures occur locally (in and around the flame), thus resulting in the formation of NOx in the exhaust gas.

It is the object of the present invention to reduce the NOx formation in the heated space also at those temperatures which are below the ignition temperature of the fuel used.

SUMMARY OF THE INVENTION

In a burner and method for the operation of such a burner including first fuel and air supply means for flameless oxidation (FLOX®—trademark of assignee operation and second fuel and air supply means for operation with flame combustion a control unit is provided for controlling fuel and air supply means in such a manner that, aided by flame combustion operation the temperature required for FLOX® (flameless oxidation) operation is roundly achieved and maintained in the region directly in front of the burner so as to provide for assisted FLOX® operation of the burner before the conditions for pure FLOX® operation are established.

In order to be able to perform the method in accordance with the invention, the burner comprises first fuel and air supply means for FLOX® operation (FLOX is a registered trade mark of the assignee of this application, WS-Wärmetechnik GmbH) as well as second fuel and air supply means for warm-up operation. In addition, the burner comprises control means for operating the fuel and air supply means. The control means are set up to maintain an assisted FLOX® mode, during which the first fuel supply and air supply means as well as the second fuel and air supply means are active. Optionally, the control means may also be configured so as to able to switch between the FLOX® mode and the warm-up mode.

The assisted FLOX® mode in accordance with the invention can be used when the volume to be heated has a temperature below the ignition temperature of the fuel that is being used. A recirculation flow that is to be maintained in the volume to be heated is thus not hot enough to safely maintain a stable flameless oxidation of the fuel. The missing thermal energy is generated in a heat source which is simultaneously fed by the second fuel and air supply means. For example, this heat source is a combustion chamber in which a stable flame is burning. The hot exhaust gases of this combustion chamber enter as a jet into the volume and mix with the cooler recirculating gases of the volume to be heated. This results in an (exhaust) gas stream in which the FLOX® operation may take place despite a lower volume temperature. To the extent that a NOx formation takes place in the combustion chamber or another heat source due to flame combustion, this affects only a fraction of the total stream of fuel and air, so that—in comparison with the fully flame supported heating of the volume—less NOx is generated. The method is also suitable in cases in which there is not a complete switch between a FLOX® combustion mode and a flame combustion mode. In this way, it becomes possible to approximate the temperature profile in the furnace space in the FLOX® combustion mode and the flame combustion mode. In addition, a multi-fuel mode may be possible, e.g., by operating the preheating source (combustion chamber) with a first fuel and by operating the other fuel supply arrangement with a second, different, fuel.

Preferably, the method in accordance with the invention comprises not only the said assisted FLOX® mode but, in addition, a warm-up mode that takes place below a first temperature threshold and, for example is achieved by exclusively actuating the second fuel and air supply means. For example, in this instance, only the combustion chamber is in operation.

In addition, the method in accordance with the invention may provide that, in an additional operating mode above a sec- and temperature threshold, a pure FLOX® operation is established in that only the second fuel and air supply means is operated.

The inventive burner and the inventive method are thus particularly suitable for the generation of thermal energy in processes that take place at lower temperatures or that move through long warm-up phases, wherein the NOx emissions are lowered in particular during the warm-up and transition phases.

The method and the burner are suitable for gaseous as well as for liquid and, optionally also for particulate solid fuels that have been fluidized, for example, by air or exhaust gas.

The invention will become more readily apparent from the following description thereof on the basis of the accompanying drawings. The description is restricted to essential aspects of the invention and miscellaneous situations. The drawings show additional details and supplement the description.

DESCRIPTION OF PARTICULAR EMBODIMENTS

Figure 1:
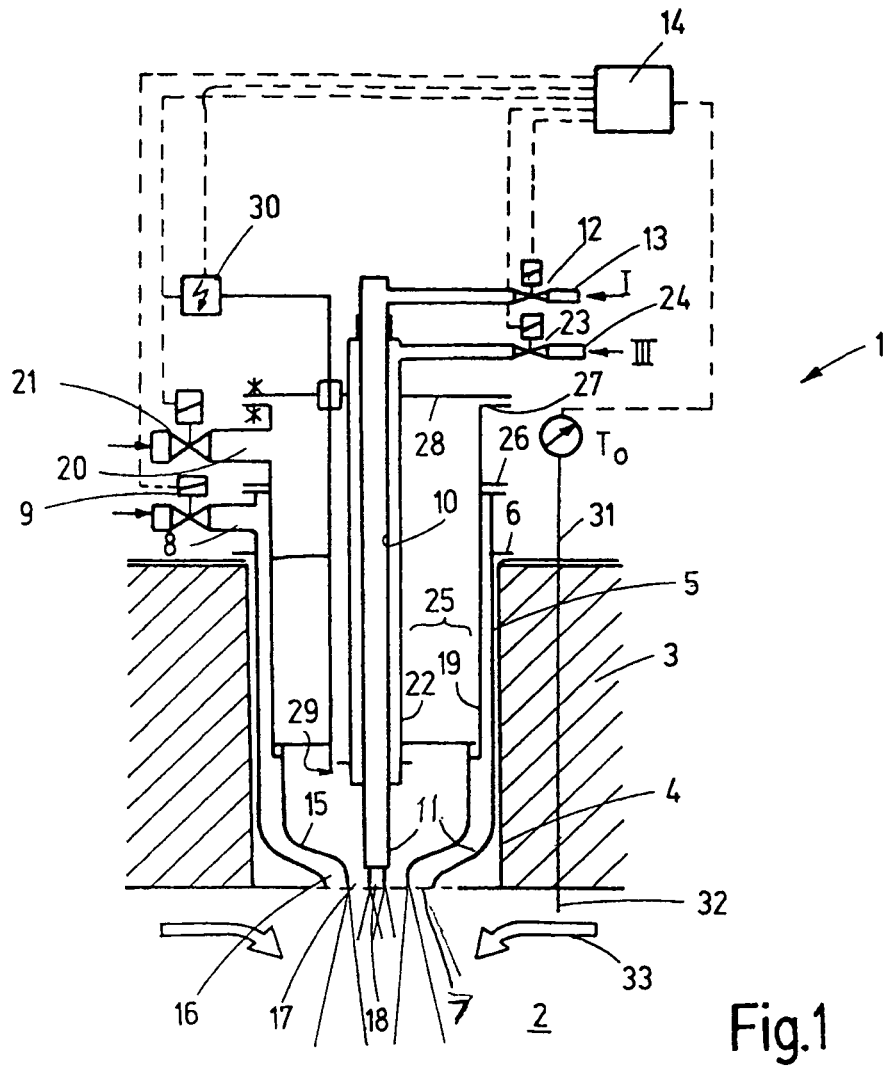
FIG. 1 is a schematic illustration, in longitudinal section, of the burner in accordance with the invention.
Figure 2:
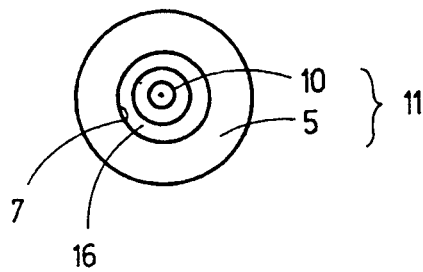
FIG. 2 is a front view of the burner in accordance with FIG. 1.
Figure 3:
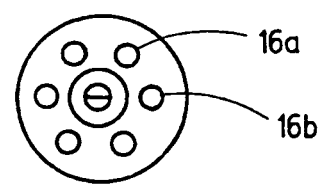
FIG. 3 is a front view of a modified embodiment of a burner.

FIG. 1 shows a burner 1 that is used to heat a furnace space 2 or another volume such as, for example, the interior space of a jet pipe. The furnace space 2 is enclosed by a furnace wall 3 having an opening 4 into which the burner 1 is inserted. The burner 1 comprises an outer pipe 5 that is secured in a sealed manner to the furnace wall 3 by a flange 6 or by other means. The outer pipe 5 has an air exit opening 7 at approximately the height of the interior surface of the furnace wall 3, through which air may flow into the furnace space 2. In order to feed the air supply channel, which is enclosed by the outer pipe 5, a connection 8 is provided, said connection preferably being controlled via a valve 9 or another adjustment member.

A fuel supply pipe 10 is provided so as to be concentric to the outer pipe 5, whereby said pipe may also be referred to as the fuel lance. The mouth of said supply pipe is located approximately at the height of the interior surface of the furnace wall 3 or at an appropriate location from where the fuel may be introduced in the form of a jet into the furnace space 2. The outer pipe 5 and the central fuel supply pipe 10 form a first fuel and air supply means 11. The fuel supply pipe 10, for example, is connected—via a valve 12 or another suitable adjustment member—to a fuel supply connection 13. The valves 9, 12 are connected to a control arrangement 14 that, in so doing, controls the first fuel and air supply means 11. The control arrangement 14 may, for example, be a microcontroller-based arrangement or the like.

A combustion chamber 15 is provided inside the outer pipe 5 with the fuel supply pipe 10 preferably extending through said combustion chamber. Its mouth is preferably located at the height of the interior surface of the furnace wall 3. Together with the air exit opening 7 of the outer pipe 5, it defines an annular nozzle 16. However, the mouth 17 of the combustion chamber 15 can also be set back with respect to the orifice of the outer pipe 5. Likewise, the open end of the fuel supply pipe 10 may be provided with a nozzle 18 that may also be located inside the combustion chamber 15 in order to direct a fuel jet through the combustion chamber 15 and its mouth 17 into the furnace space 2.

Preferably, the combustion chamber 15 is supplied with combustion air via an air supply pipe 19 that may be arranged, e.g., so as to be concentric with the outer pipe 5. It may also comprise one or more eccentric pipes. The air supply pipe 19 leads to a connection 20 that, preferably, is supplied with fresh air which has not been preheated. The supplied stream of air can be controlled by means of a valve 21 or another adjustment member that, in turn, is controlled by the control unit 14. Alternatively, it is possible to use a diaphragm, a throttle, a manually adjustable valve or the like instead of the valve 21. In this case, even in pure FLOX® mode, some air will always flow into the combustion chamber; however, this is tolerable or even desired in many cases.

In addition, fuel can be supplied to the combustion chamber 15 via a fuel supply pipe 22 that is connected to a fuel supply connection 24 by way of a valve 23, for example. Preferably, the valve 23 is connected to the control Unit 14 and is controlled by said control unit.

The air supply pipe 19 and the fuel supply pipe 22 form a second fuel and air supply means 25 that is operated in a controlled manner by the control unit 14, i.e., it is controlled or regulated. Via a flange 26, the air supply pipe 19 may be connected to the outer pipe 5 outside the furnace space 2 in an airtight manner and, via another flange, to a burner head 28 in a tight manner and thus be sealed.

Preferably associated with the combustion chamber 15 is an ignition electrode 29 with an ignition generator 30, said ignition generator being controlled by the control unit 14. In addition, one or more temperature sensors 31 may be provided, said sensors extending, e.g., through the furnace wall 3 or also through the burner 1 in order to detect the temperature in the furnace space 2. In particular, the sensor is arranged in such a manner that its temperature sensitive part 32 detects the temperature of the recirculating stream 33 in the furnace space 2.

Different from the burner 1 in accordance with FIG. 1, it is also possible to provide a series of, e.g., individual annular air exit openings 16a, 16b, etc. instead of the annular nozzle 16. Furthermore, it is possible to provide a recuperator instead of the outer pipe 5, said recuperator's exterior side, for example, being in contact with the exhaust gas stream discharged from the furnace space 2. The inside as well as the outside of such a recuperator outer pipe may be provided with projections, fins or the like in order to improve the heat exchange. Furthermore, the supplied air can be directed—starting from the connection 8—through an annular arrangement of heat exchanger pipes which are flattened, so-called flattened pipes, whereby exhaust gas flows around said pipes' exterior and whereby said pipes' orifices 16a, 16b direct individual, now preheated, fresh air jets into the furnace space 2.

Figure 4:
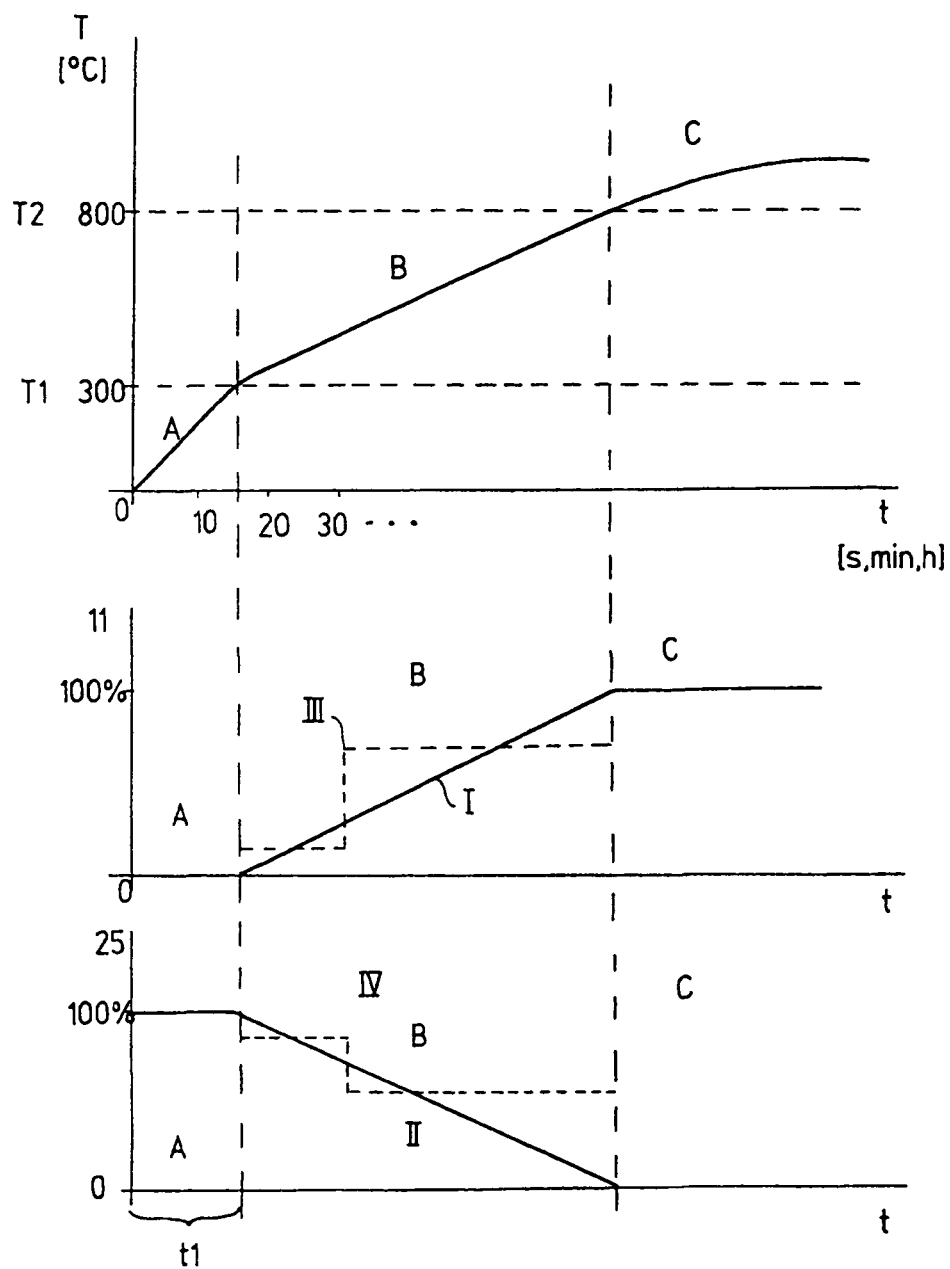
FIG. 4 shows various modes of operation of the burner in accordance with FIG. 1 as a diagram representing the individual activity or actuation of the two air and fuel supply arrangements 11 and 25 (bottom two diagrams).

The operation of the so-far described burner 1 permits at least one assisted FLOX® mode of operation; however, in the present exemplary embodiment, three different modes of operation are possible, namely (a) a preheating mode, (b) an assisted FLOX® mode and (c) a pure FLOX® mode. For explanation of said mode, reference is made to FIG. 4. At a point in time t=0 it is assumed that the temperature at the start of operation is below a first temperature limit T1 of, e.g., 300° C. Now, the control unit 14 actuates only the second fuel and air supply means 25 in that it opens the valves 21, 23 and keeps the vales 9, 12 closed. In addition, ignition pulses are generated at the ignition electrode 29. Now a combustion, for example, with the formation of a stable flame, occurs in the combustion chamber 15. The hot exhaust gases of this combustion exit at the mouth 17 and enter into the furnace space 2. Said exhaust gases heat said furnace space for a specified time. The mode of operation in FIG. 4 is identified as mode A for a first time interval t1. During this time, the temperature T in the furnace space 2 increases rapidly. During the entire time period t1, the first fuel and air supply means 11 is inactive, while only the second fuel and air supply means 25 is active.

As soon as the first temperature threshold T1 has been reached, the assisted FLOX® mode B starts. To this end, the control unit 14 begins to actuate the first fuel and air supply means 11 and to de-actuate the second fuel and air supply means, whereby this may be accomplished by appropriately enabling the valves 9, 12, 21, 23. As shown by FIG. 4, this may be done—starting at 0 or 100%, either continuously or also incrementally. In assisted FLOX® mode B, part of the supplied air and the supplied fuel is combusted in the combustion chamber 15 in order to produce a hot exhaust gas stream. Another part is injected via the annular nozzle 16 and the nozzle 18 into the furnace space 2. To this end, the distribution is preferably determined with the use of the measured temperature of the recirculating stream 33 in such a manner that the mixture of the hot gases of the combustion chamber 15 with the comparatively cooler gases of the recirculating stream 33 results in a mixed gas jet having a temperature that is just above an ignition temperature T2. Consequently, the percentage of fuel injected through the fuel lance or the nozzle 18 is carried by the exhaust gas/air jet in which a flameless oxidation may take place even though the temperature of the recirculating stream 33 is below the limit T2 that is required therefor.

Any assistance of the flameless oxidation by the hot gases of the combustion chamber 15 may decrease continuously with increasing temperature T, as is shown by the curves I and II (solid lines) in FIG. 4.

Alternatively, the process may be switched in one or more steps as indicated by curves III, IV (dotted lines) in FIG. 4, or indicate a step at the start or end of the continuous adjustment. In both cases, the percentage of the part of the fuel combusted in the combustion chamber 15 can be restricted to 10 to 50% of the total amount.

If the control unit 14 detects an increase of the temperature of the recirculating stream 33 above the temperature limit T2, said limit being determined, for example, by the ignition temperature of the fuel that is being used and, in the illustrated example may be, e.g., 800° C., said control unit 14 switches the fuel and air supply means 25 completely off and now relies fully on the FLOX® operation inside the furnace space 2. In this mode of operation C, air may continue to flow through the air and fuel supply means 11.

With the invention presented herein, it is possible to achieve lower NOx values not only in FLOX® mode (mode C) but, in particular, also at low temperatures in the furnace space, said temperatures being either desired or inevitably occurring during warm-up (modes A and, in particular B). Lower NOx values can be achieved in that, by means of a heat source such as, for example, a combustion chamber 15, a recirculating gas stream 33 that is actually too cold for FLOX® operation is heated in order to be able to react a (large) part of the fuel that is being used in this heated gas stream in the furnace chamber 2 or in another volume in a flameless manner, in particular without local temperature peaks, above 1500° C.

The method in accordance with the invention relates to the operation of at least one burner with first fuel and air supply means 11 for FLOX® operation and with second fuel and air supply means 25 for operation with heat augmentation. A control unit 14 is provided for controlling the fuel and air supply means 11, 25, i.e., in such a manner that, due to heat augmentation, the temperature required for FLOX® operation is achieved in the region directly in front of the burner.

REFERENCE NUMERALS

1 Burner
2 Furnace space
3 Furnace wall
4 Orifice
5 Pipe jacket
6 Flange
7 Air exit opening
8 Connection
9 Valve
10 Fuel supply pipe
11 First fuel and air supply means
12 Valve
13 Fuel supply connection
14 Control arrangement
15 Combustion chamber/combustion space
16 Annular nozzle
17 Mouth of the combustion chamber 15
18 Nozzle
19 Air supply pipe
20 Connection
21 Valve
22 Fuel supply pipe
23 Valve
24 Fuel supply connection
25 Second fuel and air supply means
26, 27 Flange
28 Burner head
29 Ignition electrode
30 Ignition generator
31 Temperature feeler
32 Temperature-sensitive part
33 Recirculating stream

What is claimed is:

1. A method for the operation of a burner (1) for heating a furnace space (2), the burner including first fuel and air supply means (11) for a flameless combustion of fuel injected into the furnace space (2) via a central fuel injection nozzle (18) and second fuel and air supply means (25) for supplying fuel and air to a combustion chamber (15) within the burner for combustion therein to produce a hot gas for heating the furnace space (2), and a control unit (14) for controlling the first and second fuel and air supply means (11, 25), the method comprising the steps of: after warm-up operation (A) of the furnace space (2) to a first temperature threshold by activation of flame combustion of the fuel and air in the combustion chamber (15), establishing a flameless combustion operation (B) of the first fuel and air supply means (11) assisted by hot combustion gas generated in the combustion chamber (15) by the combustion of the fuel and air of the second fuel and air supply means (25) and discharged via an annular discharge opening (17) extending around the central fuel injection nozzle (18) so as to form a hot gas envelop around the fuel jet injected into the furnace space (2) via the central fuel nozzle (18).

2. The method according to claim 1, wherein the warm-up operation (A) is established below a first temperature threshold, the assisted flameless combustion operation (B) is established above the first temperature threshold and, above a second temperature threshold, pure flameless combustion operation (C) is established by shutting down the second fuel and air supply means (25).

3. The method according to claim 2, wherein, during the assisted flameless combustion operation, the ratio of the gas or air amount supplied via the first fuel and air supply means (11) relative to the gas or air amount supplied via the second fuel and air supply means (25) is adjustable.

* * * * *